(12) United States Patent
Vig

(10) Patent No.: US 6,378,878 B1
(45) Date of Patent: Apr. 30, 2002

(54) SELF-LEVELING SUSPENSION SYSTEM

(75) Inventor: Justin W. Vig, Fort Wayne, IN (US)

(73) Assignee: Navistar International Transportation Corp., Warrenville, IL (US)

( * ) Notice: Subject to any disclaimer, the term of this patent is extended or adjusted under 35 U.S.C. 154(b) by 0 days.

(21) Appl. No.: 09/406,324

(22) Filed: Sep. 28, 1999

(51) Int. Cl.7 .............................................. B60G 17/00
(52) U.S. Cl. .................. 280/6.159; 280/5.5; 280/5.514; 280/5.508
(58) Field of Search ............................... 280/5.5, 5.502, 280/5.508, 5.514, 6.15, 6.159, 6.16

(56) References Cited

U.S. PATENT DOCUMENTS

| | | | | |
|---|---|---|---|---|
| 1,964,617 A | | 6/1934 | Bird ............................... 37/42 |
| 3,866,894 A | * | 2/1975 | Sweet et al. ................... 267/31 |
| 3,970,293 A | * | 7/1976 | Sweet et al. ................. 280/712 |
| 4,099,741 A | * | 7/1978 | Sweet et al. ................. 280/712 |
| 4,397,478 A | * | 8/1983 | Jensen et al. ................ 280/711 |
| 4,468,739 A | * | 8/1984 | Woods et al. ................. 364/424 |
| 4,939,655 A | * | 7/1990 | Majeed et al. .......... 364/424.05 |
| 5,193,063 A | * | 3/1993 | Assh ...................... 364/424.05 |
| 5,452,919 A | * | 9/1995 | Hoyle et al. ................. 280/840 |
| 5,465,209 A | * | 11/1995 | Sammut et al. ........ 364/424.05 |
| 5,584,497 A | * | 12/1996 | Lander et al. ............... 280/711 |
| 5,662,357 A | * | 9/1997 | Ryu .......................... 280/840 |
| 5,696,678 A | * | 12/1997 | Raad et al. ........... 364/424.046 |
| 5,859,692 A | | 1/1999 | Ross, Jr. et al. ........... 356/4.01 |
| 5,941,920 A | * | 8/1999 | Schubert ...................... 701/37 |

FOREIGN PATENT DOCUMENTS

| | | |
|---|---|---|
| JP | 06219126 | 8/1994 |
| WO | PCT/GB97/03314 | 6/1998 |

\* cited by examiner

*Primary Examiner*—J. J. Swann
*Assistant Examiner*—L. Lum
(74) *Attorney, Agent, or Firm*—Jeffrey P. Calfa; Dennis Kelly Sullivan; Neil T. Powell

(57) ABSTRACT

A single air spring positioned under one side of a vehicle provides side to side leveling of the vehicle. Main springs support the vehicle above a pair of coaxial wheels or coaxial wheel sets. An auxiliary, inflatable air spring is positioned to provide additional support to the vehicle above one of the wheels. Deflection of the main springs from a norm or index is indicated by movement of tie rods mounted from the wheels, axle, or base of the main springs relative to the suspended portion of the vehicle. One tie rod is directly linked to a free end of an equalizer lever whereby the equalizer lever moves in the same direction as the tie rod. The second tie rod is coupled to the remaining free end of the equalizer lever by a rotatable rod, whereby the appropriate end of the equalizer lever moves in the direction opposite to the tie rod. The equalizer lever is suspended at its center from an actuation lever for a valve used to control inflation and deflation of the auxiliary air spring. The actuation lever has a pivot axis fixed with respect to the suspended vehicle, so movement the center point of the equalizer lever results in movement of the actuation lever. The direction of movement of the actuation lever results in valve action to inflate, deflate, or hold the pressure in the auxiliary air spring.

11 Claims, 4 Drawing Sheets

FIG. 5

| LOAD CASE | BEFORE FILL OR EXHAUST ||||| VALVE | AFTER FILL OR EXHAUST |||||
|---|---|---|---|---|---|---|---|---|---|---|---|
| | SUSPENSION TRAVEL (*) || LEVER POSITION (**) ||| | SUSPENSION TRAVEL (*) || LEVER POSITION (**) ||| VALVE |
| | RIGHT | LEFT | A | B | C | | RIGHT | LEFT | A | B | C | |
| I | 0 | 0 | 0 | 0 | 0 | CLOSED | 0 | 0 | 0 | 0 | 0 | CLOSED |
| II | 1 | 0 | 1 | 0 | 0.5 | FILL | 0 | 0 | 0 | 0 | 0 | CLOSED |
| III | 2 | 1 | 2 | -1 | 0.5 | FILL | 1 | 1 | 1 | 0 | 0 | CLOSED |
| IV | 2 | 2 | 2 | -2 | 0 | CLOSED | 2 | 2 | 2 | -2 | 0 | CLOSED |
| V | -2 | 0 | -2 | 0 | -1 | EXHAUST | 0 | 0 | 0 | 0 | 0 | CLOSED |
| VI | -1 | 1 | -1 | -1 | -1 | EXHAUST | 1 | 1 | 1 | -1 | 0 | CLOSED |

* SUSPENSION TRAVEL IS POSITIVE FRO COMPRESSION AND NEGATIVE FOR EXTENSION.
** LEVER POSITION IS POSITIVE FOR UP AND NEGATIVE FOR DOWN

SELF-LEVELING SUSPENSION SYSTEM

BACKGROUND OF THE INVENTION

1. Field of the Invention

The present invention relates to vehicle suspension systems and more particularly to a suspension system providing side to side vehicle leveling for off center vehicle loads.

2. Description of the Prior Art

Side biased vehicle payloads, that is, the loading of a greater weight to one side of a vehicle rather than the other, cause a conventionally suspended vehicle to list toward the side of the vehicle carrying the greater weight. Vehicle list can produce undesirable vehicle handling problems.

Certain types of loads produce a predictable, but intermittent, load bias. For example, liftable snowplows, wingplows and mixers frequently produce asymmetrical, intermittent loads when mounted to trucks. Such devices may vary in the load they impose with the use to which they are put, but they always bias load to the same side. For example, snowplows are frequently larger at one end than the other. When the plow is lowered much of the plow's weight is supported directly by the ground, but when the plow is lifted, the side of the vehicle carrying the larger, heavier end of the plow is more heavily loaded than the side carrying the smaller end of the plow.

Air springs have been used in vehicle suspensions for a number of years. Where cost is not an object, air springs may be used for suspension adjacent every wheel position. Air spring extension is controlled by adding or removing air from the spring. By keying the addition or removal of air to a measurement of the extension of the spring (or a functionally equivalent measurement), spring extension may be kept constant. This allows complete, and independent height control of the vehicle, and automatically solves the list problem.

However, for reasons of cost, including the cost for air springs, an independent height control system and the expense required to redesign vehicles for air springs and to add auxiliary wheel positioning elements, many vehicles continue to be built with conventional springs, and leaf springs particularly remain commonly employed in trucks. There is no convenient way to adjust the spring rate of a leaf spring in the field to compensate for loading of the vehicle, much less uneven loading.

The prior art has partially addressed the problem of uneven loading of trucks which retain conventional leaf spring suspensions. By the addition of a single auxiliary air spring, positioned between a leaf spring and a vehicle frame side rail adjacent the wheel expected to be closest to the load, additional support for the frame may be introduced by adding air to the auxiliary air spring. Such an auxiliary spring need not be large enough to support the entire vehicle weight, allowing it to be smaller and the retention of the leaf spring avoids the need for a major redesign of the vehicle suspension. Since a smaller spring can be used, the expense of providing a spring capable of fully supporting the vehicle is saved.

The control of a single auxiliary air spring has been based on a simple measurement of the local change in spacing from the frame rail to the axle. Air is then added or exhausted to return the extension of the spring to its default spacing. Such an arrangement compensates for the extra load carried locally, but ignores the lesser, but possibly substantial additional loads carried by the remaining springs, particularly the spring disposed at the opposite end of the same axle. The result is that the vehicle list, while usually reduced in degree, still exists, but occurs on the opposite side of the vehicle.

SUMMARY OF THE INVENTION

It is an object of the invention to provide a vehicle leveling system.

It is another object of the invention to provide complete side to side leveling of a vehicle with respect to an axle using a single auxiliary air spring.

According to the invention there is provided an apparatus for leveling opposed sides of a vehicle over first and second coaxial wheels. Main springs support the vehicle above each wheel. An auxiliary, inflatable air spring is positioned to provide additional support to the vehicle above one of the wheels. Deflection of the main springs from a norm or index is indicated by movement of tie rods mounted from the wheels, axle, or base of the main springs relative to the locally suspended portion of the vehicle. One tie rod is directly linked to a free end of an equalizer lever whereby the equalizer lever moves in the same direction as the tie rod. The second tie rod is coupled to the remaining free end of the equalizer lever by a rotatable rod, whereby the appropriate end of the equalizer lever moves in the direction opposite to the tie rod. The equalizer lever is suspended at its center from an actuation lever for a valve used to control inflation and deflation of the auxiliary air spring. The actuation lever has a pivot axis fixed with respect to the suspended vehicle, so movement the center point of the equalizer lever results in movement of the actuation lever. The direction of movement of the actuation lever results in valve action to inflate or deflate the pressure in the auxiliary air spring. Once leveling occurs, the volume of the air spring is held constant.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 5 is a table of loading conditions and compensating action taken by the self leveling system.

DETAILED DESCRIPTION OF THE INVENTION

Figure 1:
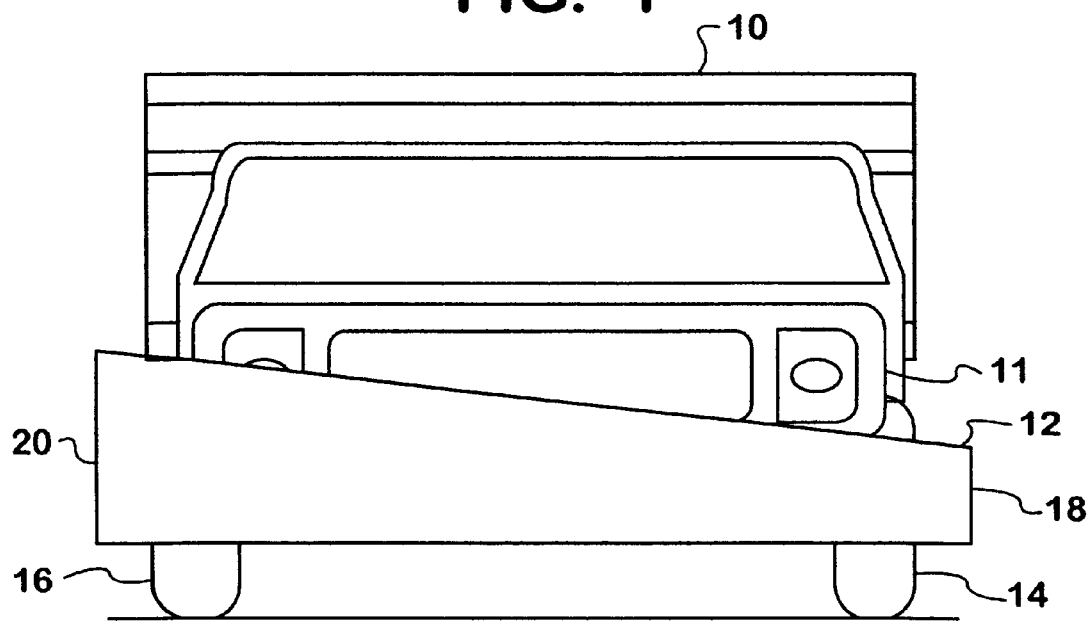
FIG. 1 is a front view of a truck carrying an asymmetrical snowplow in a lifted position.
Figure 2:
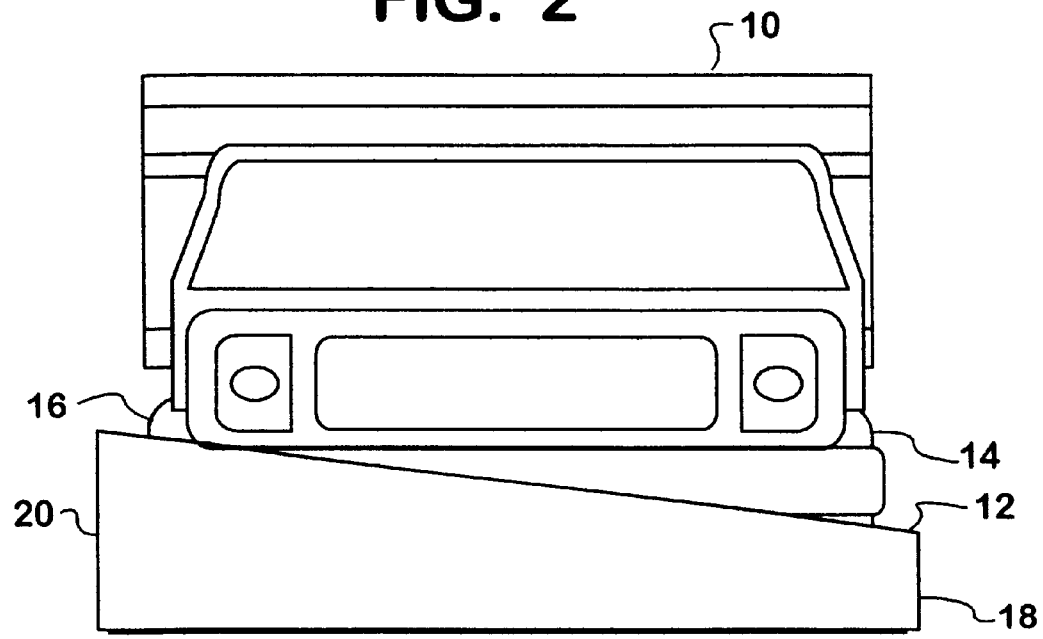
FIG. 2 is a front view of a truck with a snowplow in a working position supported on the ground.

FIGS. 1 and 2 illustrate a truck 10 viewed headon toward front end 11. Front end 11 supports an asymmetric snowplow 12. The bulk of the weight of truck 10 (the suspended or sprung weight) is supported by suspension springs positioned between the vehicles wheels (the unsprung weight) and the vehicle's chassis or frame (shown in part in FIG. 3).

Snowplow 12 is illustrated in both a lifted position for travel and unlifted position resting on a road bed allowing snow to be pushed to the side of the road. Snowplow 12 widens from a narrow end 18 along the driver's side of the vehicle to a broad end 20, which in conventional use may be placed near the edge of a road along the passenger side of truck 10. Typically snowplow end 18 is positioned further forward from truck 10 than broad end 20, allowing snow to slide along the plow from end 18 to end 20 before sliding off to the side of the vehicle. The plow broadens to allow for buildup of more and more snow as snow traverses across the front of truck 10 as the truck moves forward.

A problem presented by the fact that plow 12 widens across the front of truck 10 is that when the plow is lifted, a greater portion of the weight of the plow is supported by the passenger side suspension than is supported by the driver side suspension. This can cause truck 10 to list to the passenger side. Asymmetric loads can result from an uneven weight distribution, differences in distances between a support point on the truck 10 and the load, or a combination of these factors.

Figure 3:
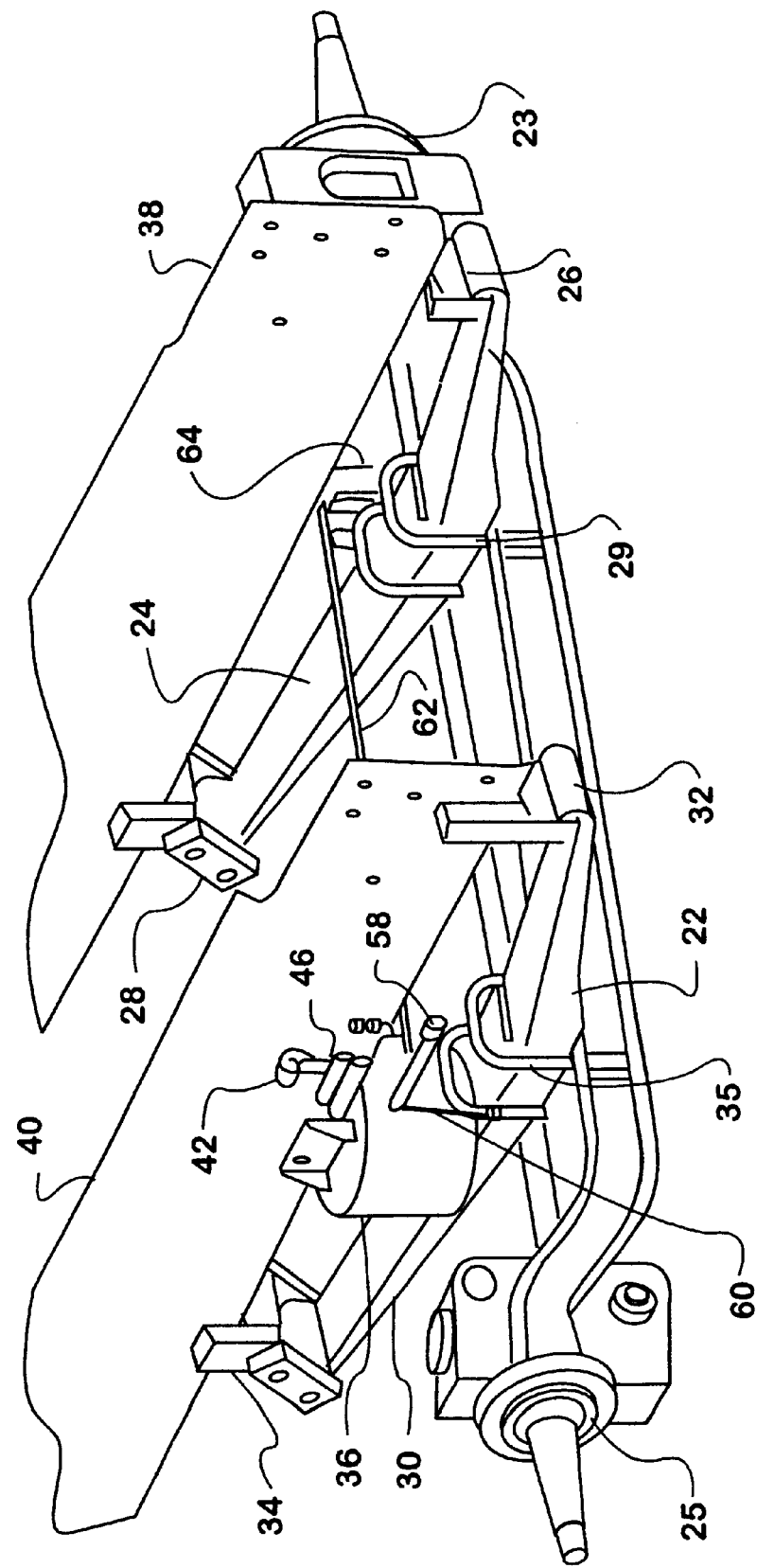
FIG. 3 is a perspective view of a vehicle suspension incorporating the side to side leveling system of the present invention.

FIG. 3 illustrates a suspension system 21 such as might be used with a steering axle 22 installed on a vehicle used to carry a snowplow or other asymmetrical load from its front end. Wheel assemblies 23 and 25 depend from the opposite ends of axle 22. Leaf springs 24 and 30 support the vehicle from axle 22 along side frame rails 38 and 40, respectively, of the vehicle's chassis. Leaf spring 24 is mounted to driver side frame rail 38 by a spring mount 26 and a longitudinally movable shackle box 28. Leaf spring 24 is mounted to and above axle 22 by a clamp group 29. Spring 24 flattens (compressibly deflects) upwardly toward frame rail 38 upon imposition of a load on the vehicle, and flattens more than other springs when more of the load is localized above the spring. When the load is removed spring 24 returns to a less compressively deflected, less flattened shape.

Leaf spring 30 similarly supports passenger side frame rail 40 via mount 32 and shackle box 34. Spring 30 is mounted above axle 22 by a clamp group 35. Again, spring 30 is subject to changes in deflection, both compressive and expansive, by changes in the load it supports. An auxiliary air spring 36 is positioned between leaf spring 30 and frame rail 40 to provide additional support to frame rail 40 because the vehicle is subject to predictable overloading along the passenger side. Auxiliary air spring 36 operates to level the vehicle from side to side, but does not operate to restore the vehicle an unloaded height.

The pressure in air spring 36 is controlled by a valve 42, which is positioned on rail 40. A linkage system arranged to detect differential deflection of springs 30 and 24 in turn controls valve 42. Elements of the linkage system include a valve actuation lever 46, an equalizing lever 58 suspended from a free end of actuation lever 46, a rotatable control rod 62 and tie rods 60 and 64. The term "compressive deflection," as used herein, means a suspension movement resulting in greater compression, particularly compression of a leaf spring by an amount greater than occurs for an empty vehicle. The term "extensive deflection" means expansion of a main spring from a compressed state.

Figure 4:
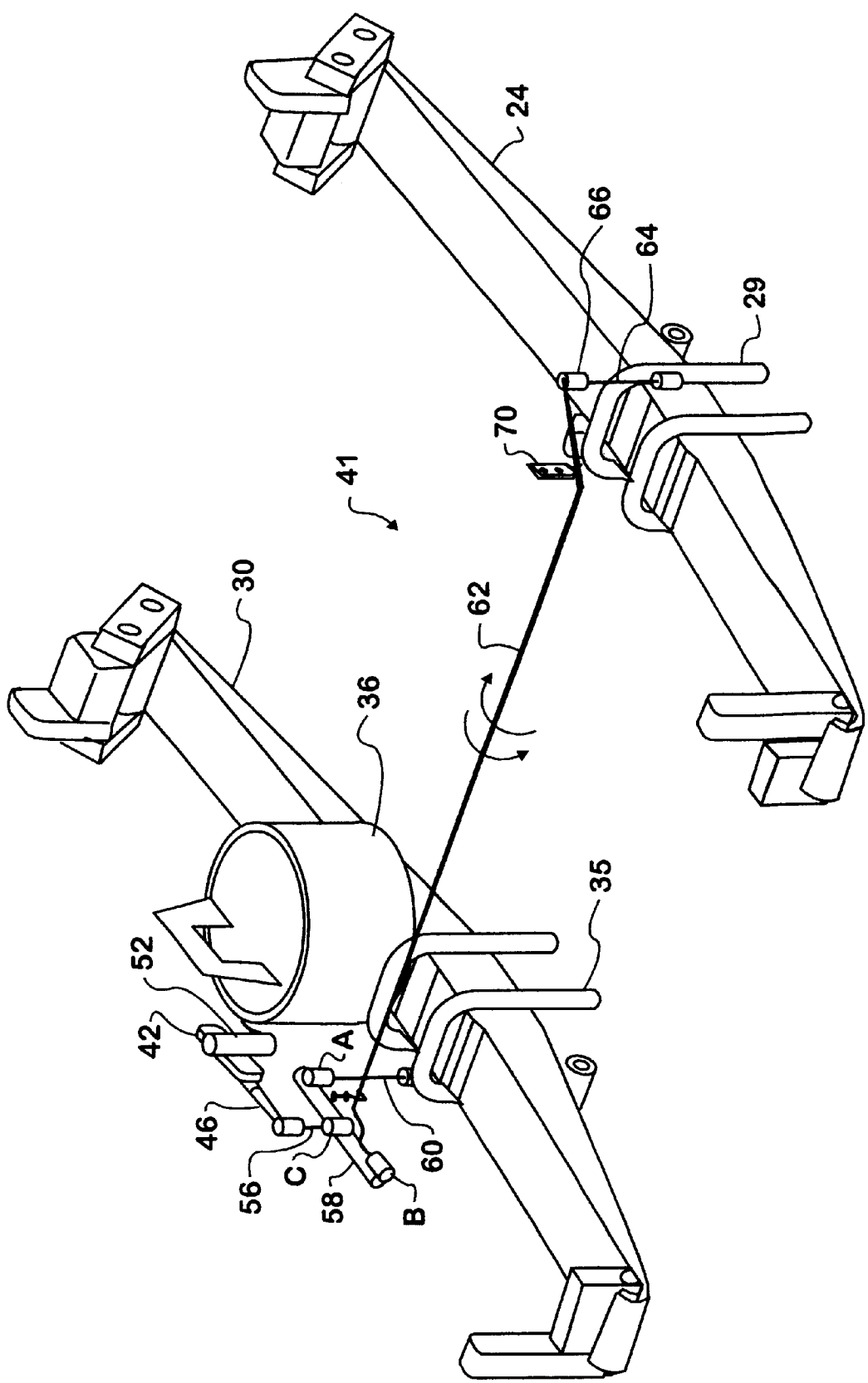
FIG. 4 is a second perspective view of the self leveling elements of the suspension system of FIG. 3.

FIG. 4 illustrates a control linkage system 41 for valve 42 and auxiliary air spring 36. Valve 42 can add air to air spring 36 from a compressed air source (not shown), such as a tank or pump installed on the vehicle, through conduit 52, allow air to be discharged from air spring 36 by conduit 52, or hold the pressure in air spring 36 constant by closing conduit 52. Operation of the conduit is determined by the position of an actuation lever 46 extending from valve 42. Actuation lever 46 has a free end distal to the point of connection of the lever to the valve. When actuation lever 46 is in a neutral position extending parallel to frame rail 40, actuation lever 46 closes both conduits. When the free end of lever 46 moves upwardly toward rail 40, conduit 52 is connected to a compressed air source allowing air to be added to air spring 36. When the free end of lever 46 moves downwardly from neutral toward spring 30, conduit 52 is opened to allow the discharge of air from air spring 36.

The free en lever 46 is positioned by a tie rod 56, which is connected between the free end of the actuation lever and the center point of an equalizing lever 58. Equalizing lever 58 floats between leaf spring 30 and actuation lever 46. Movement of the center point of equalizing lever 58 results in the upward or downward travel of actuation lever 46.

The movement of the center point C of lever 58 depends upon the movement of the opposite ends A and B of the lever. Movement of the ends of lever 58 in turn depends upon changes in spacing between the vehicle and two spaced points along the axle 12 corresponding to tie rods 60 and 64. One end "A" of lever 58 is connected by a tie rod 60 directly to a clamp group 35 which attaches spring 30 and axle 22. Compressive deflection of spring 30 results in tie rod 60 pushing its end of equalizing lever 58 upwardly. Expansion of spring 30 pulls end A of lever 58 downwardly. The second end "B" of equalizing lever 58 is linked by a crossover rod 62 to a tie rod 64, which attaches to clamp group 29. Crossover rod 62 is rotatably mounted in one or more frames 70 depending from the suspended portion of the vehicle. Upward and downward movement of tie rod 64 is translated into rotational movement of rod 62 by a linkage 66. Crossover rod 62 turns outwardly adjacent equalizing lever 58 and is connected at the end of the rod to free end "B" of lever 58. Rotation of crossover rod 62 translates into downward or upward movement of the end of rod 62 and the free end of lever 58. Upward movement of tie rod 64 results in downward movement on end B of equalizing lever 58 while downward movement of tie rod 64 results in upward movement of the lever.

The center point of equalizing lever 58 moves up or down from its neutral index if leaf springs 24 and 30 are deflected from their index positions in opposite directions, or if deflected in the same direction, but by different amounts unequal in absolute magnitude. If the center point of lever 58 moves, that movement effects a translation of the free end of actuation lever 46 via tie rod 56. Valve 42 then admits or discharges air from air spring 36 until the springs 24 and 30 are equally deflected.

FIG. 5 provides a series of load conditions and the resulting steps taken by the suspension leveling system to effect side to side leveling. The table assumes that the right vehicle side periodically carries the greater load and is the side to which an air spring auxiliary leveling device has been applied. In the table the letter A (under LEVER POSITION for both "BEFORE FILL OR EXHAUST", i.e. after imposition or removal of a load, and under "AFTER FILL OR EXHAUST", i.e. e has compensated for imposition or removal of a load) indicates the position versus an index of the end of equalizing lever 58 connected to tie rod 60. The letter B indicates the position of the end of equalizing lever 58 connected to crossover rod 62 and the letter C indicates the position of the central pivot of lever 58.

Load case I reflects the default, unloaded condition of the vehicle. All lever positions are at the neutral or index position. No change is required in pressurization of air spring 36 since the vehicle is level from side to side.

Load cases II and III occur when the right side assumes a load greater than the left side carries. Case II reflects a case where there is no compressive deflection of the left side and Case III reflects a situation where the left side suspension is compressively deflected, but to a lesser extent than the right. Point B moves in the opposite direction of the direction of movement of spring which it is connected to. Point C reflects an average for proportional positions of A and B, for example (2−1)/2=0.5. Here, point C having moved, the actuation lever 46 also moves resulting in air being added to air spring 36 until the average of the points A's and B's positions is 01. The process ends with the valve being closed.

Load case IV reflects equal loading of both sides of the vehicle, which compresses the springs, but produces no vehicle list. In this case nothing occurs since the vehicle remains level from side to side. Deflection of the springs was equal in magnitude producing cancelling movements and leaving the position of the center point of equalizing lever 58 unchanged.

Load cases V and VI reflect removal of a load. Right side suspension travel goes negative upon removal of a load, indicating expansive deflection of spring 30 from its default position. Again, point C reflects an average of the positions of points A and B. Positioning of point C away from its index (downward from level in the preferred embodiment) results in air being exhausted from the air spring 36 until point C returns to its index position and the valve closes.

The present invention provides side to side leveling of a vehicle with respect to an axle, while compensating for loading of both sides using a single auxiliary air spring. While illustrated with a mechanical system for determining differentiated main spring deflection, electronic measuring systems could be readily provided.

While the invention is shown in only one of its forms it is not thus limited but is susceptible to various changes and modifications without departing from the spirit and scope of the invention.

What is claimed is:

1. A vehicle including a suspension for supporting the vehicle from side to side over an axle oriented orthogonally with respect to the sides, the vehicle comprising:
   symmetric spring support means for suspending the vehicle over the axle;
   a load intermittently supported on the symmetric spring support means which produces a predictable list to a first side of the vehicle when so supported; and
   a leveling system coupled to the vehicle suspension including;
   an auxiliary air spring positioned to provide support to a first of the sides of the vehicle from the axle;
   means for indicating spacing of the vehicle from the axle at first and second locations spaced along the axle;
   means responsive to the means for indicating for determining if
   (i) the spacing at the first location is compressed relative to a predetermined index, and the spacing at the second location is extended relative to the spacing at the first location indicating a list toward the first side of the vehicle, and
   (ii) the spacing at the first location is extended relative to the predetermined index, and the spacing at the second location is compressed relative to the spacing at the first location indicating a list toward the second side of the vehicle; and means responsive to determination of (i) for adding air to the auxiliary air spring and further responsive to determination of (ii) for releasing air from the auxiliary air spring.

2. A vehicle as claimed in claim 1, wherein the determination responsive means further include:
   an actuable air valve;
   an air line connected between the auxiliary air spring and the actuable air valve;
   a valve actuating lever extending from the actuable air valve which: (i) in a first position pressurizes the air line; (ii) in a second position opens the air line; and (iii) in a third position closes the air line.

3. A vehicle as claimed in claim 1, wherein the means for indicating include:
   an equalizer lever depending at a center point from a distal end of the valve actuating lever; and
   the means for indicating comprising a first linkage connected between the first location on the axle and a first end of the equalizer lever and a second linkage connected between the second location on the axle and the second end of the equalizer lever.

4. A vehicle as claimed in claim 3, wherein the equalizer lever is pivotally suspended at the central point from the valve actuating lever and the valve is positionally fixed with respect to the vehicle.

5. A vehicle as claimed in claim 4, wherein the symmetric spring support means include:
   a first leaf spring for supporting a first side of the vehicle above the first location along the axle; and
   a second leaf spring for supporting a second side of the vehicle above the second location along the axle.

6. A vehicle as claimed in claim 5, wherein the linkage includes:
   a first tie rod connecting from the first location along the axle to the first end of the equalizer lever; and
   a second tie rod coupled from the second location along the axle to the second end of the equalizer lever.

7. Apparatus for leveling opposed sides of a vehicle over first and second coaxial wheels, each of which wheels is located adjacent a different one of the opposed sides, the apparatus comprising:
   first spring means for supporting the vehicle above the first wheel;
   second spring means for supporting the vehicle above the second wheel;
   an auxiliary air spring positioned to support the vehicle above the first wheel;
   means for indicating compressive deflection and expansive deflection of the first spring means relative to an index;
   means for indicating compressive deflection and expansive deflection of the second spring means relative to the index; and
   means responsive to indication of compressive deflection of the first spring means greater than the compressive deflection of the second spring means for adding air to the auxiliary air spring, and further responsive to detection of expansive deflection of the first spring means greater than the expansive deflection of the second spring means for exhausting air from the auxiliary air spring.

8. Apparatus as claimed in claim 7, wherein the deflection responsive means includes an airflow control valve communicating with the auxiliary air spring and an actuating lever for the airflow control valve, where the actuating lever has a pivot positionally fixed on a suspended portion of the vehicle.

9. Apparatus as claimed in claim 8, wherein the deflection responsive means further includes an equalizer lever suspended at a central pivot, from a free end of the actuating lever.

10. Apparatus as claimed in claim 9, wherein the first spring and second spring deflection indicating means each comprise a linkage having one end positionally fixed adjacent a point of attachment between the spring means and its respective wheel and a second end linked to one of opposite ends of the equalizer lever.

11. Apparatus for leveling opposed sides of a vehicle over first and second coaxial wheels, comprising:

first and second main springs supporting the vehicle from bases on the first and second coaxial wheels, respectively;

an auxiliary air spring is positioned to provide additional support to the vehicle above the first wheel;

first and second tie rods mounted from points fixed with respect to the bases of the first and second main springs;

an equalizer bar linked at a first end to the first tie rod and coupled at a second end by a rotatable link to the second tie rod, whereby the first and second ends of the equalizer bar move in opposite directions with unidirectional deflection of the main springs;

an actuation lever having a free end from which the equalizer bar is suspended at a midpoint; and an air spring pressurization control valve actuated by the actuation lever.

* * * * *